Feb. 10, 1931.    O. RUTH    1,792,039
LUGGAGE CARRIER
Filed Dec. 12, 1927    2 Sheets-Sheet 1
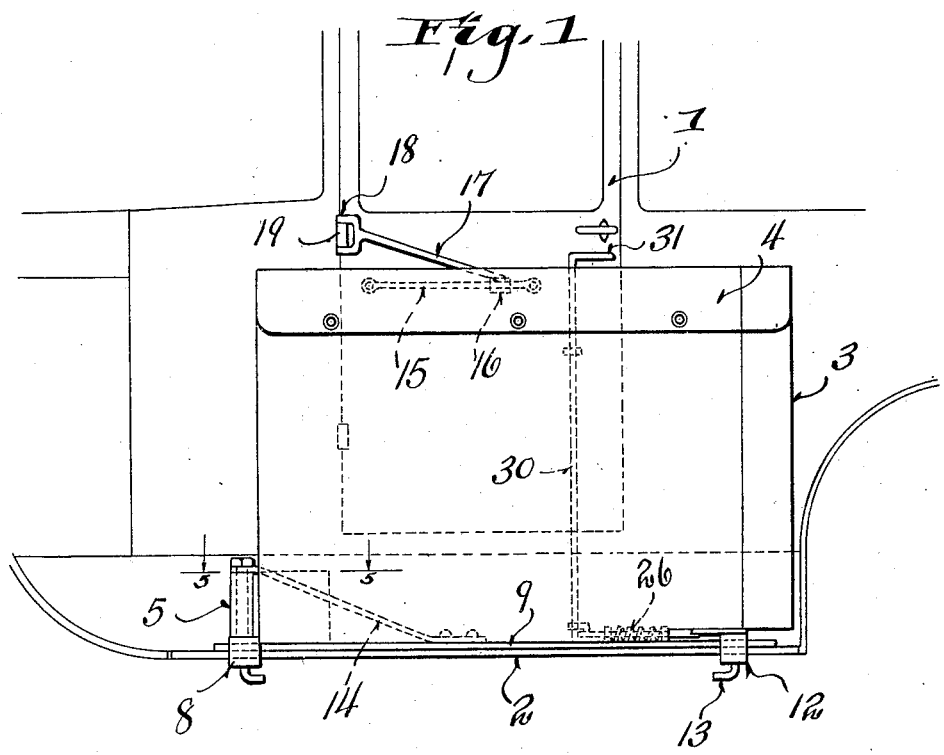
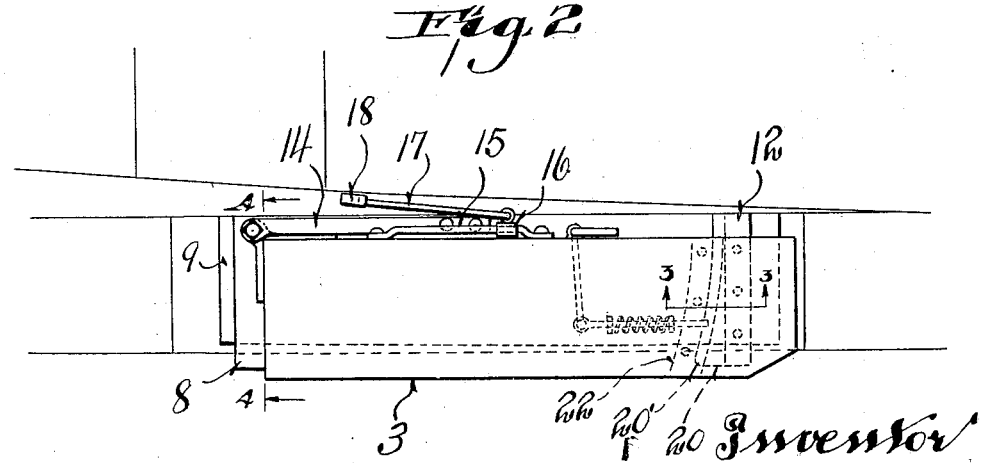
Inventor
Omer Ruth
By
Attorneys Feb. 10, 1931. O. RUTH 1,792,039
LUGGAGE CARRIER
Filed Dec. 12, 1927 2 Sheets-Sheet 2
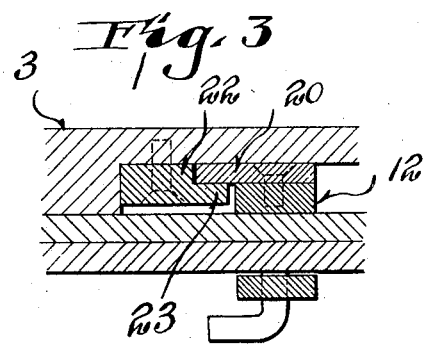
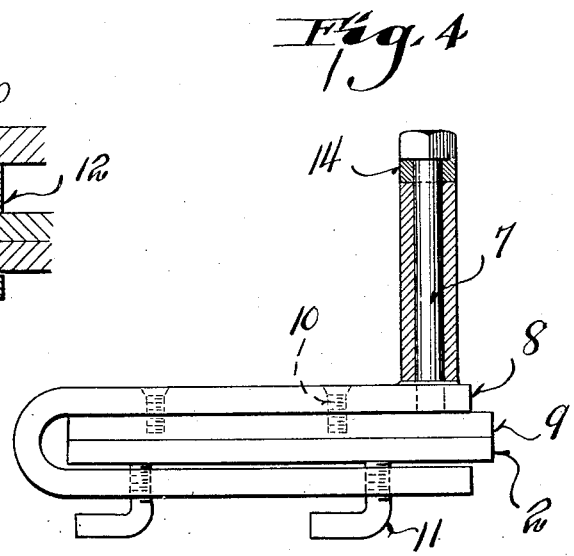
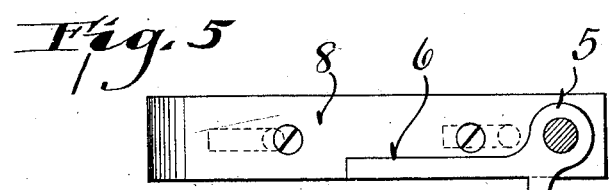
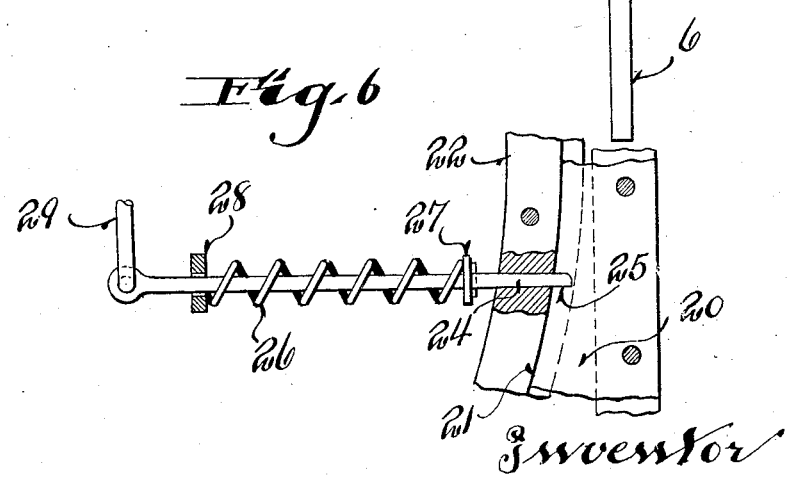
Inventor
Omer Ruth
Attorneys Patented Feb. 10, 1931

1,792,039

UNITED STATES PATENT OFFICE

OMER RUTH, OF RACINE, WISCONSIN

LUGGAGE CARRIER

Application filed December 12, 1927. Serial No. 239,473.

This invention relates to luggage carriers.

Objects of this invention are to provide a luggage carrier which is adapted for detachable positioning upon an automobile running board, and which is so supported that it may be swung out of the way of the door, although the luggage carrier can extend upwardly a material distance above the bottom of the door.

Further objects are to provide a novel form of luggage carrier in which a secure support for the swinging luggage carrier is obtained, and in which a simple locking means easily manipulable from the upper side of the luggage carrier is provided so that the carrier may be readily locked in place, or may be unlocked and swung out of the way of the door.

An embodiment of the invention is shown in the accompanying drawings, in which:

Figure 1 is a side elevation of the luggage carrier, showing a portion of the automobile.

Figure 2 is a plan view of the structure shown in Figure 1.

Figure 3 is a sectional view on the line 3—3 of Figure 2, drawn to an enlarged scale.

Figure 4 is a sectional view on the line 4—4 of Figure 2.

Figure 5 is a sectional view on the line 5—5 of Figure 1.

Figure 6 is an enlarged detail of a portion of the latching means.

Referring to the drawings, it will be seen that a fragment of an automobile has been illustrated as provided with the usual door 1 and running board 2. A luggage carrier is positioned upon the running board and in front of the door and is carried in a novel manner to permit its ready swinging out of the way of the door when it is desired to open the door. The luggage carrier consists of an elongated and relatively high rectangular member 3 having an entrance flap or top 4 which may be snapped or locked in place in any desired manner. It is carried at one end by means of a hinge 5, preferably located adjacent its forward lower corner. This hinge 5 is provided with a pair of right-angular arms 6 which are secured to the rear side of the luggage carrier, as indicated in Figure 2.

The hinge is carried by means of a relatively long pintle pin 7 which is securely attached to the upper arm of a clamp 8. The pin 7 may, if desired, be provided with a head. The clamping member 8 is U-shaped and is provided with a bottom plate 9 attached thereto by means of the screws 10. The bottom member of the U-shaped clamp is provided with a pair of locking bolts or clamping bolts 11, preferably formed of a threaded, angularly bent metal rod. This U-shaped member is positioned over the running board, as indicated in Figures 1 and 4, and is clamped in place by means of the clamps 11. A second U-shaped member 12 is positioned adjacent the rear of the luggage carrier and is similarly attached to the floor board or base 9. It is locked in place by means of the clamping bolts 13 similar to the bolts 11. Preferably a diagonal and rearwardly extending brace 14 is secured to the base 9 and extends upwardly and is attached to the pin 7, as shown in Figures 1 and 4. Thus the brace materially strengthens the hinge construction. The luggage carrier is securely attached to the base 9 and swings outwardly thereon.

In order to provide a support for the upper portion of the luggage carrier, an elongated guide 15 is provided and carries a slide 16. The slide 16 is pivotally carried by means of a downwardly extending arm 17. The upper end of the arm 17 is bifurcated or forked to provide the spaced arms 18, arranged upon opposite ends of the pintle which forms part of the hinge 19. This hinge 19 may be one of the usual door hinges with the pintle thereof extending beyond the ends of the sleeve. In this manner a sliding connection between the lower end of the rod 17 or upper brace and the luggage carrier is obtained and still a support for the upper portion of the luggage carrier is secured by this construction. The luggage carrier therefore is pivotally supported both adjacent its lower and upper portion and a very rigid and secure structure results.

In order to prevent vibration or rattling of the luggage carrier it is to be noted that the rear clamping U-shaped member 12 has a track or flange 20 secured thereto (see Figures 2, 3, and 6). The track or flange 20, as may be seen most clearly from Figure 6, is provided with a curved face 21 which may contact with the curved shouldered portion of a track 22 carried by the luggage carrier 3. The track 22 is provided with a flange 23 which underhangs the track 20, as shown in Figure 6. A latching plunger 24 is carried by the track 22 and normally fits within a recess 25 formed in the member 20. This plunger is urged inwardly by means of the spring 26 which bears at one end against a washer 27 carried by the rod 24, and at its other end bears against the stationary guide 28.

The forward end of the latching plunger or rod 24 is connected to the lower crank arm 29 of a vertical rod 30, (see Figures 1, 2 and 6). The rod 30 extends upwardly and is provided with a projecting manipulating handle 31 above the luggage carrier. It is apparent, therefore that to unlatch the device all that is necessary is to rock the handle 31 at the upper portion of the luggage carrier, thus withdrawing the latch 24, and permitting ready outward swinging of the luggage carrier. Preferably the rear end of the plunger or rod 24 is beveled, as shown in Figure 6, to allow it to snap past the curved outer corner 20' of the track 20, as shown in Figure 2.

It will be seen, therefore, that a novel form of luggage carrier has been provided, which may be readily attached to an automobile, which, although it extends above the lower portion of the door, is, nevertheless freely movable so that it may be swung outwardly to permit ready opening of the door.

It will be seen further that a very simple and easily operable means is provided for locking the luggage carrier in place, and also it will be noted that means are provided for preventing rattling or bouncing of the luggage carrier.

Although the invention has been described in considerable detail, such description is intended as illustrative rather than limiting as the invention may be variously embodied and as the scope of such invention is to be determined as claimed.

I claim:—

In combination with a vehicle including a body having a swinging door and a running board beneath the door, a receptacle normally positioned upon the running board, means for hingedly connecting the receptacle upon the running board at one side of the door, a guide rod carried by the receptacle, a connecting arm having one end slidably mounted upon the guide rod and the other end pivotally connected to one of the hinges of the door to permit swinging movement of the receptacle and limit its outward movement relative to the vehicle, and manually controlled means for retaining the receptacle against movement upon the running board.

In testimony that I claim the foregoing I have hereunto set my hand at Racine, in the county of Racine and State of Wisconsin.

OMER RUTH.